United States Patent
Yang et al.

(10) Patent No.: US 9,058,509 B1
(45) Date of Patent: Jun. 16, 2015

(54) SCREEN PRIVACY FILTER USING SOFTWARE

(75) Inventors: Qiang Yang, Nanjing (CN); Lei Zhang, Nanjing (CN); Zhiguo Li, Nanjing (CN)

(73) Assignee: Trend Micro Inc., Tokyo (JP)

( * ) Notice: Subject to any disclaimer, the term of this patent is extended or adjusted under 35 U.S.C. 154(b) by 735 days.

(21) Appl. No.: 13/331,421

(22) Filed: Dec. 20, 2011

(51) Int. Cl.
*G06F 7/64* (2006.01)
*G06F 17/30* (2006.01)
*H04N 7/16* (2011.01)
*G06F 21/84* (2013.01)
*H04N 1/44* (2006.01)

(52) U.S. Cl.
CPC . *G06F 21/84* (2013.01); *H04N 1/44* (2013.01)

(58) Field of Classification Search
CPC ... G02F 1/323; G02F 1/133509; G02F 3/048; G06F 21/84; G06F 21/60; G06F 3/0481; H04N 1/44; H04W 12/02
USPC ...................... 345/473, 474; 704/276; 726/26
See application file for complete search history.

(56) References Cited

U.S. PATENT DOCUMENTS

| | | | |
|---|---|---|---|
| 7,779,475 B2 * | 8/2010 | Jakobson et al. | 726/26 |
| 8,004,529 B2 * | 8/2011 | Wood et al. | 345/473 |

OTHER PUBLICATIONS

No stated author; Windows Registry—Wikipedia; the Free Encyclopedia. Wikipedia. Wikimedia Foundation; Dec. 10, 2010; Accessed. Sep. 4, 2014.; Retrieved from the Internet <URL: http://en.wikipedia.org/w/index.php?title=Windows_Registry&oldid=403326607>; pp. 1-20 as printed.*

* cited by examiner

*Primary Examiner* — Saleh Najjar
*Assistant Examiner* — Feliciano Mejia
(74) *Attorney, Agent, or Firm* — Beyer Law Group LLP (57) ABSTRACT

A software-based privacy filter is provided on a computing device. First, a content window is opened and displayed on a display of the computing device. Then a semi-transparent topmost window is created, wherein the semi-transparent topmost window includes a moving privacy pattern designed to obscure first portions of the content window at a first time and obscure second portions of the content window at a second time. The semi-transparent topmost window is then displayed on top of the first content window on the display of the computing device.

23 Claims, 12 Drawing Sheets

SCREEN PRIVACY FILTER USING SOFTWARE

FIELD OF THE INVENTION

The present invention relates generally to computing devices. More particularly, the present invention is related to providing a display screen privacy filter using software.

BACKGROUND OF THE INVENTION

Given that many users utilize computing devices to perform various confidential tasks, such as banking, shopping, work-related tasks, etc., privacy when performing these tasks is a big concern. While many software solutions exist to help protect the data itself, such as encryption, access control, and so on, one large security risk still exists in the design of the computing device itself. Specifically, computing devices still almost always contain displays, which allow the user to see a virtual workspace while performing various tasks on the computing device. This display can almost as easily allow another person who is in the vicinity of the computing device to see everything the user is doing, merely by, for example, peering over the user's shoulder. This risk extends to all sorts of computing devices with displays, from ATM machines to mobile phones to laptop computers to desktop computers, and so on. All allow the user's privacy to be invaded, either intentionally or unintentionally, by other people, merely by the fact that they project light in the vicinity of the user's eyes.

One solution to this problem is to use a privacy filter. A privacy filter is a semi-transparent screen that is placed over the display of the computing device. The filter is generally composed of polycarbonate or acrylic plastic, and contains a film that acts to reduce the viewing angle of the display. As such, users viewing the display from the side cannot see the contents of the display, but a user viewing the display from straight-on can. This effectively eliminates the ability of most other people in the vicinity of the user from invading the user's privacy by viewing what is on the display.

Figure 1:
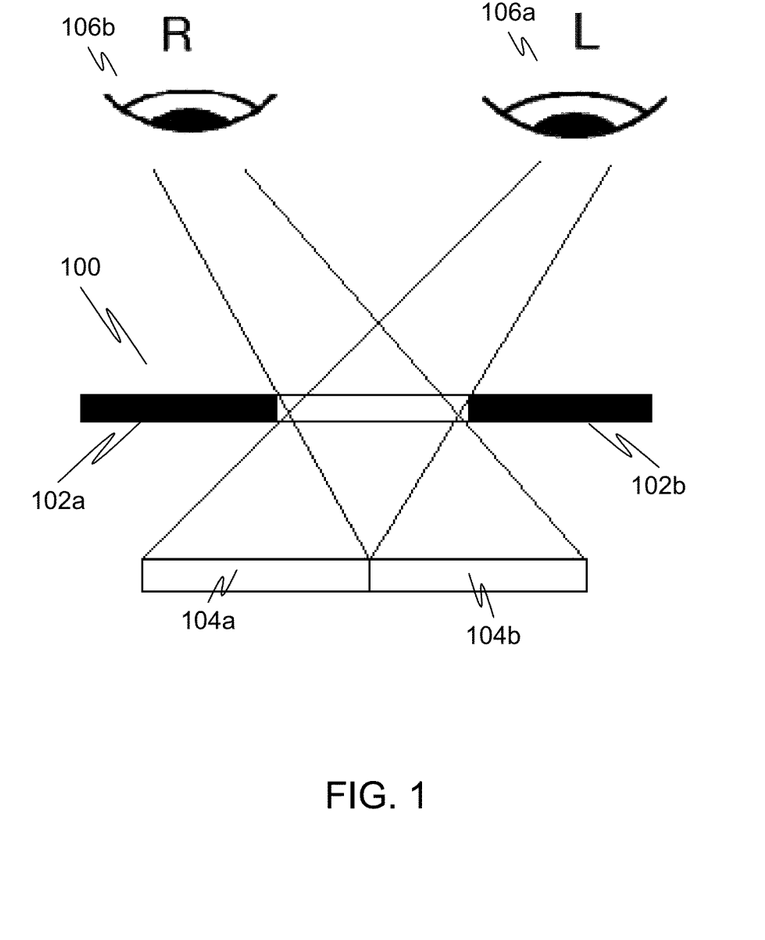
FIG. 1 is a diagram illustrating the operation of a prior art privacy filter screen.

FIG. 1 is a diagram illustrating the operation of a privacy filter screen. The screen 100 contains non-transparent slits 102a, 102b, that act as a fence. While a user who is sitting directly in front of the display can see portions 104a, 104b of the display that are behind the non-transparent slits 102a, 102b by virtue of his or her eye location 106a, 106b, users attempting to view the display from a different angle will be blocked from these area behind the slits 102a, 102b by virtue of their steeper angle of viewing.

While these types of privacy screens can be effective for many purposes, they suffer from several drawbacks. First of all, they must be physically installed on the display. Some users would actually prefer that no such privacy filter be installed (for example, if they like to have their family be able to view the display at the same time as themselves), while other users prefer that the privacy filter be installed. As such, it is difficult for a manufacturer to build such screens into the hardware of the device as some users will object to its presence. This has caused the displays to largely be an aftermarket device, installed by a user after purchase of the device, which can be burdensome on the user. Additionally, once installed, the privacy screens operate all the time until they are removed. But there may be users who wish to use the privacy screens for some of the time (when doing work, for example) while not the rest of the time (when watching movies, for example), and it is not really feasible for the user to remove the filter and put it back on when transitioning between these types of tasks.

SUMMARY OF THE INVENTION

Embodiments are provided that allow software to control a privacy filter for a display on a computing device.

In a first embodiment of the present invention, a method for providing a privacy filter on a computing device is provided, the method comprising: opening a first content window; displaying the first content window on a display of the computing device; creating a semi-transparent topmost window wherein the semi-transparent topmost window includes a moving privacy pattern designed to obscure first portions of the content window at a first time and obscure second portions of the content window at a second time; and displaying the semi-transparent topmost window on top of the first content window on the display of the computing device.

In a second embodiment of the present invention, a method for limiting viewability of a content window on a display of a computing device is provided, the method comprising: operating a main thread of an operating system of the computing device to load a user configuration, wherein the user configuration specifies parameters of a moving privacy pattern; causing the main thread to open a topmost window, wherein the topmost window covers at least one content window on the display; causing the main thread to open a controller thread using the user configuration, wherein the controller thread operates to generate a moving privacy pattern in the topmost window in accordance with the parameters of the user configuration.

In a third embodiment of the present invention, a method for creating a virtual privacy screen on a computing device is provided, the method comprising: creating a semi-transparent topmost window covering at least a portion of displayable content on a display of the computing device; filling the semi-transparent topmost window with a moving animation including parallel lines divided by transparent lines, wherein the parallel lines are semi-transparent or non-transparent, wherein the animation moves the parallel lines in a direction that is perpendicular to the lines at a rate specified by an adjustable parameter; and causing the semi-transparent topmost window to be displayed over at least the portion of displayable content on the display of the computing device.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In a first embodiment of the present invention, a software-based privacy filter is provided that allows software, such as the operating system of a device, to control whether or not a viewing angle of a display is reduced.

In an embodiment of the present invention, this is accomplished by overlaying a semi-transparent software window over the displayable content on the display. Rapidly moving parallel lines are dynamically created in this semi-transparent topmost window, creating a virtual picket fence. At any moment, each of the user's two eyes will see portions of a different image when looking through this virtual picket fence. The parallel lines (virtual picket fence) move so rapidly past the user's eyes that the lines blur out and are not seen. Thus, from the front of the screen, the underlying content can be viewed clearly. However, from the side of the screen, especially from a large angle, a visual illusion is created, making it difficult to view screen content.

The term semi-transparent window as used in this document means that at least some portion of the window is not completely transparent. In many cases, the semi-transparent window will include some portions that are completely transparent (the breaks in the virtual picket fence) and some portions that are non-transparent or semi-transparent (the pickets in the virtual picket fence).

Figure 2A:
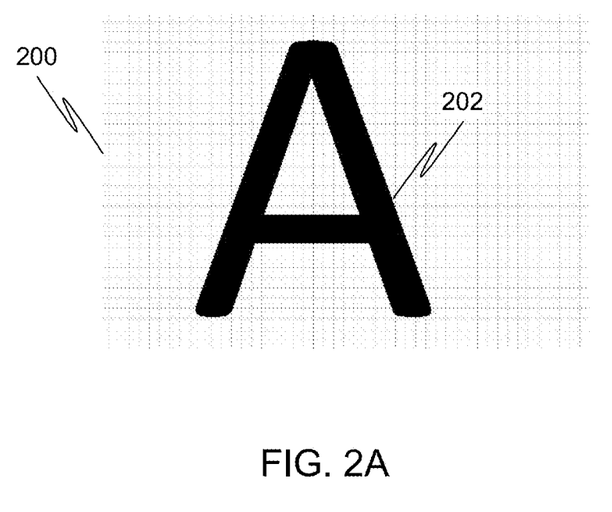
FIGS. 2A-2C depicts an example of a virtual picket fence in accordance with an embodiment of the present invention.
Figure 2B:
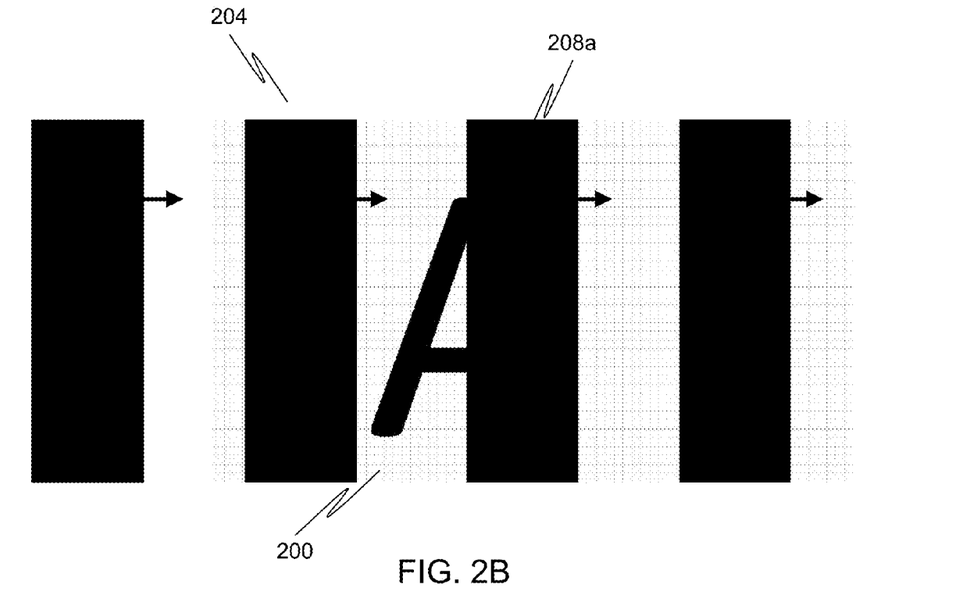
Figure 2C:
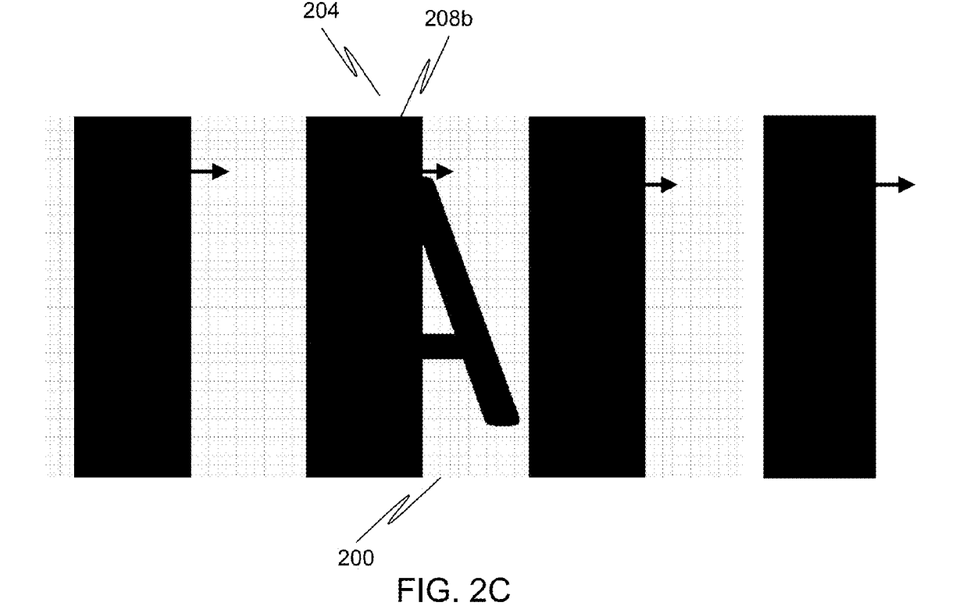

FIGS. 2A-2C depicts an example of a virtual picket fence in accordance with an embodiment of the present invention. FIG. 2A depicts an ordinary content window 200, here displaying the letter "A" 202. FIG. 2B depicts this ordinary content window 200 overlaid with the semi-transparent topmost window 204 containing parallel lines, at one particular time. As can be seen, at this particular time, the rightmost portion of the "A" 202 is blocked by one of the parallel lines 208a. FIG. 2C depicts the ordinary content window 200 overlaid with the semi-transparent topmost window 204 at a later time. Due to the movement of the virtual picket fence, now the leftmost portion of the "A" is blocked by one of the parallel lines 208b. This acts to create a visual illusion to users attempting to view from extreme angles, while the semi-transparent topmost window is virtually undetectable to a user viewing from straight-on. It should be noted that in these diagrams the lines 208a, 208b are depicted as being completely non-transparent, but in some embodiments these lines may be semi-transparent. Additionally, in these diagrams the non-line portions of the semi-transparent topmost window 204 (e.g., the portions covering the rightmost portion of the A 202 in FIG. 2B and covering the leftmost portion of the A 202 in FIG. 2C) are depicted as being completely transparent, but in some embodiments these areas may be semi-transparent.

In an embodiment of the present invention, a controller thread controls the semi-transparent topmost window. This provides a significant level of control over the ultimate "virtual picket fence," including controlling the line style (or picture type, if a non-line picture is preferred), the line color and transparency (the lines themselves may be semi-transparent as opposed to only non-transparent), the width and length of the line, the movement of the line, and the density of the line.

In one embodiment, the main thread uses one of several built-in parameter packages. Users can choose among these packages by their device type (which includes factors like screen type, screen size, dots per inch, and font). There may also be a control panel provided for users to adjust the parameters manually. These parameters are then passed to the controller thread to control the topmost window as described above.

It should be noted that while horizontal movement of the privacy pattern is depicted in FIGS. 2A-2C, the movement may be in any direction. For example, the pattern may move in a vertical motion, in a diagonal motion, in a circular motion, etc.

The movement of the lines or other pattern may be created using any suitable computer graphics or animation tool.

Figure 3:
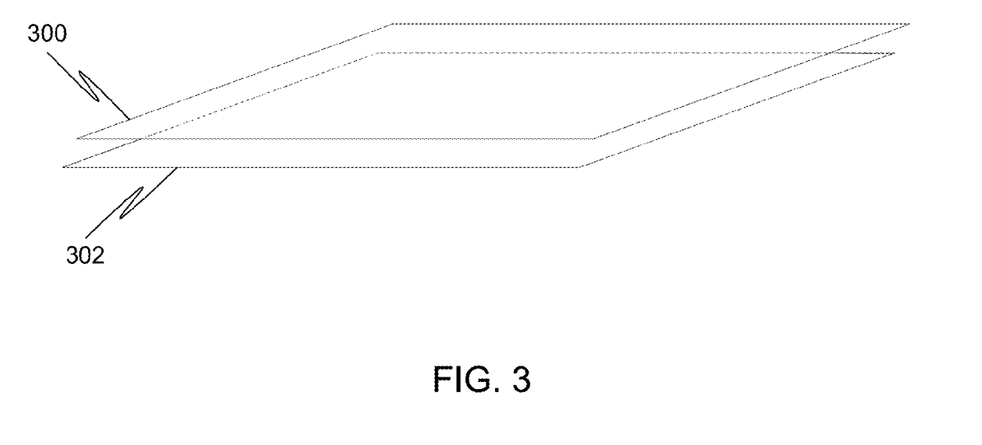
FIG. 3 is a diagram illustrating the semi-transparent topmost window in accordance with an embodiment of the present invention.

FIG. 3 is a diagram illustrating the semi-transparent topmost window in accordance with an embodiment of the present invention. It should be noted that this window 300, and the content window 302 which it covers, are software based windows and thus the depth illustrated in FIG. 3 is really just for explanatory purposes. In reality, since these are not physical windows, they are actually not physically one on top of the other, but displayed at the single level of the screen display of the computing device.

It should be noted, however, that there may be embodiments where the windows 300 and 302 are displayed to the user at different depths, including, for example, a three dimensional display that permits multiple levels of viewable layers to a user.

Nevertheless, in one embodiment, the semi-transparent topmost window 300 covers all viewable content on the display. As such, there is no part of the display that is viewable without the effects of the semi-transparent topmost window 300.

Figure 4:
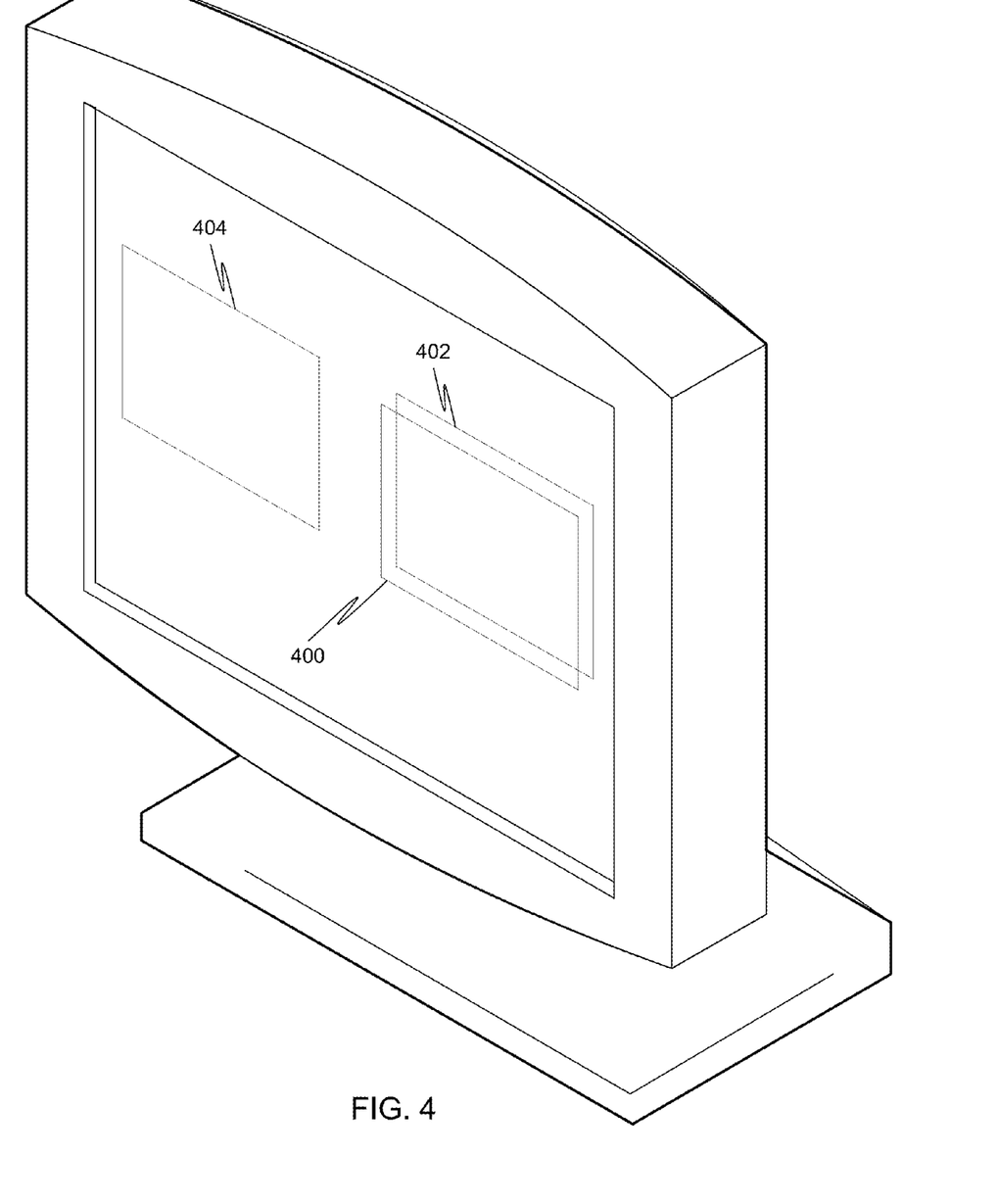
FIG. 4 is a diagram illustrating the semi-transparent topmost window in accordance with another embodiment of the present invention.

FIG. 4 is a diagram illustrating the semi-transparent topmost window in accordance with another embodiment of the present invention. Here, rather than cover the entire viewable area of the display, the semi-transparent topmost window 400 covers only one particular content window 402 that is smaller than the viewable portion of the display. Indeed, the viewable portion of the display here includes a content window 402 that is covered by the semi-transparent topmost window 400 and a content window 404 that is not so covered. This allows the system to act to provide privacy filtering on some content on a display while not on other content. This can be especially helpful if the user is viewing some content that is private and simultaneously viewing some content that is not. For example, content window 402 may include confidential work files, while content window 404 is a television broadcast. This further distinguishes this embodiment of the present invention from the prior art, in that physical privacy filters must protect the entire screen, and have no ability to protect only portions of the screen, let alone portions like content windows 402, 404 which can be moved around on the screen by the software or by the user. In order to facilitate the resizing or movement of the content windows, in one embodiment the topmost window is linked to the content windows which it covers.

In another embodiment, the topmost window is simply controlled by the user and it is up to the user to resize or move the window to cover the underlying content window(s) he or she wishes to cover.

Figure 5:
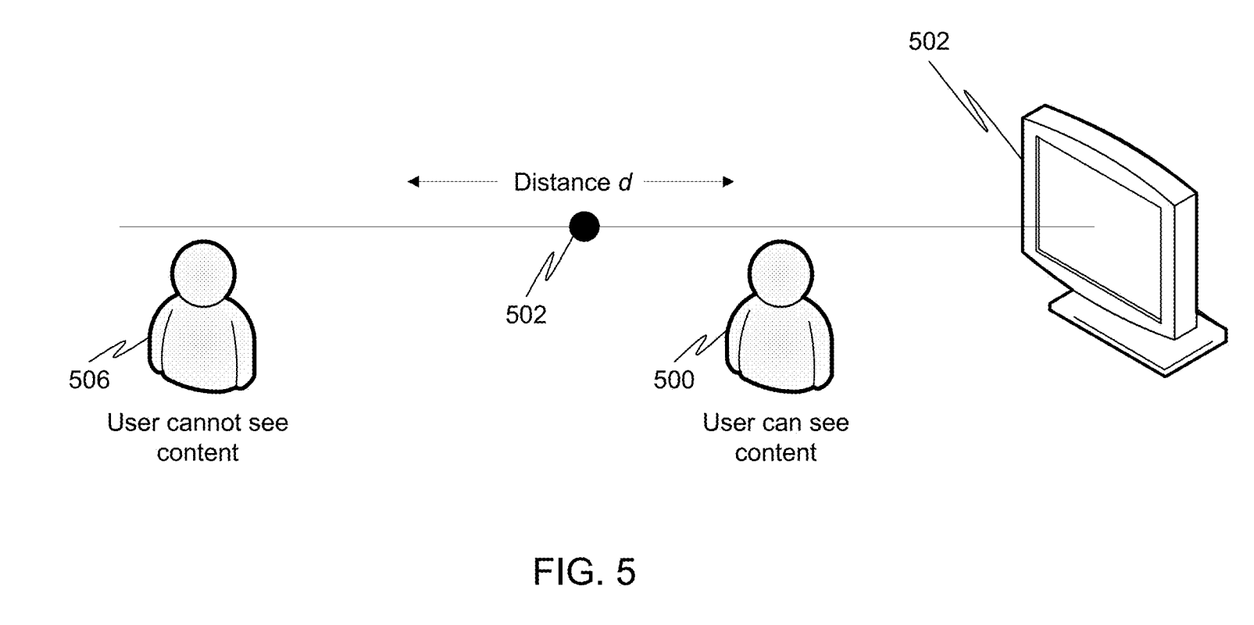
FIG. 5 is a diagram illustrating the acceptable viewing angle in accordance with an embodiment of the present invention.

It should be noted that the virtual picket fence of the present invention can act not only to prevent people from viewing the private content when attempting to view from extreme viewing angles, but can also prevent people who are attempting to view the screen from a distance from seeing the content. In other words, even if the person is viewing the content from straight-on, if they are viewing it from far enough away, they will be unable to view the content due to the effects of the virtual picket fence. This is illustrated in FIG. 5. Here, user 500 is within a distance 502 from the display 504, and thus is able to view the content in a content window covered by a semi-transparent topmost window displaying a virtual picket fence in accordance with an embodiment of the present invention. User 506, however, is beyond the distance 502, and thus will not be able to view the content. Distance 502 is variable and can be altered by changing the underlying properties of the virtual picket fence design In order to obtain the "distance-based" privacy aspect, the transparency of the topmost window will be a vital factor. As the transparency level changes, the distance d beyond which users will be unable to be view the underlying content window will also change. Additionally, the speed at which the pattern moves in the topmost window will slow down the resolution of the display, which will also make the underlying content less visible (in this case, blurrier), and thus more difficult to read from farther away. In other words, a faster speed makes the content more difficult to read from farther away.

In another embodiment of the present invention, the dynamic lines in the virtual picket fence are portrayed in an attractive manner, such as by using an attractive color or design. Since the human brain is geared towards focusing vision on attractive versus non-attractive patterns, this acts to further draw the attention of the eye away from the underlying content window. In another example, the topmost window may contain a colorful, moving object (or series of objects), such as a moving cube with color having a certain frequency. This has the dual effect of blocking the content window when viewed from certain angles, and also drawing the attention of the eye of any user who is in a borderline area (i.e., at the cusp of the acceptable viewing angle or acceptable distance).

Figure 6:
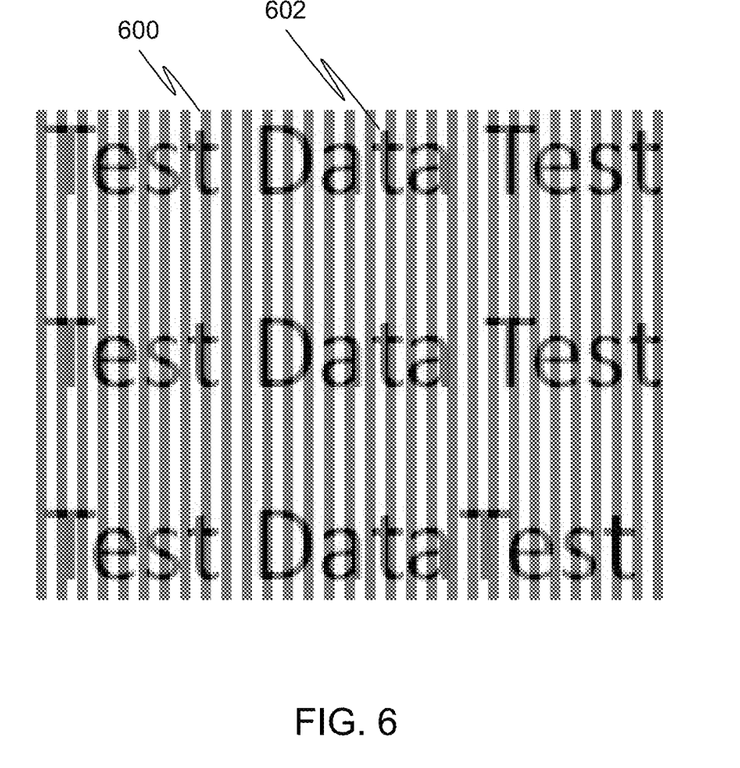
FIG. 6 is a diagram illustrating an example of a screen print of a screen containing a semi-transparent topmost window displaying a virtual picket fence in accordance with an embodiment of the present invention.

In an embodiment of the present invention, attempting to utilize a "screen print" command that would typically print a screen capture of all the viewable content on the display at a particular time will be impacted by the virtual picket fence, making the screen capture unattractive. FIG. 6 is a diagram illustrating an example of a screen print of a screen containing a semi-transparent topmost window displaying a virtual picket fence in accordance with an embodiment of the present invention. As can be seen, lines 600 are present on the content 602. This can be beneficial for security reasons, as it can prevent unauthorized users from obtaining usable screen prints of private data. However, in some embodiments it may be beneficial to remove this feature. This may be accomplished in a number of different ways. One way would be to temporarily turn off the virtual picket fence when a screen print command is received, and turn it back on when the screen print command is executed. Another way would be for the screen print command itself to be modified to capture only the content underneath the semi-transparent topmost window.

A similar protection is provided if one is attempting to take a photograph of the screen, even from a head-on angle. As with the screen print case, this feature can be turned off using the various ways described above.

System Process

Figure 7:
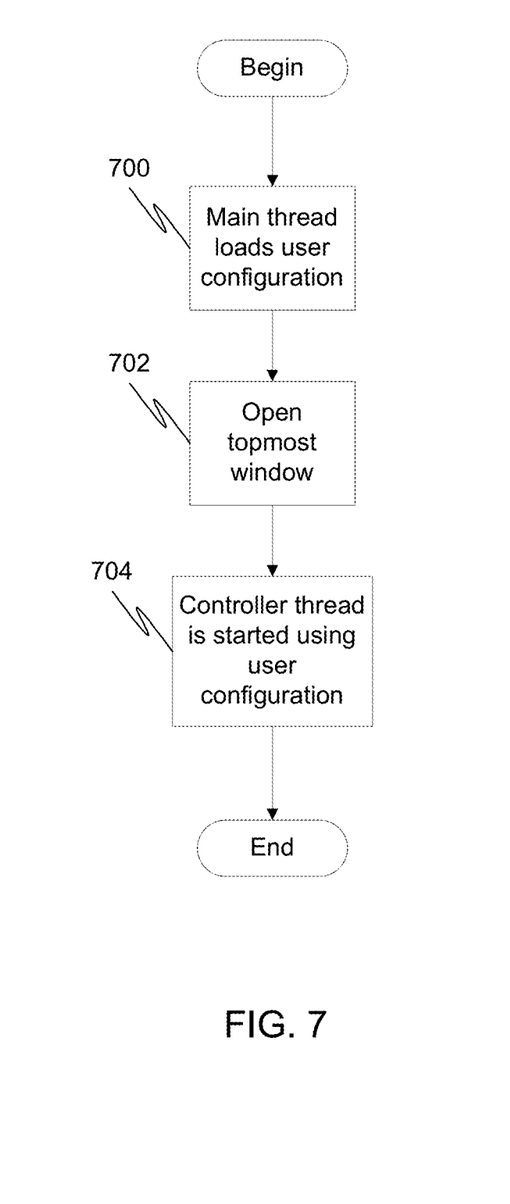
FIG. 7 is a flow diagram illustrating the process flow of the main thread in accordance with an embodiment of the present invention.

In an embodiment of the present invention, a main thread of an operating system initiates operation of the virtual picket fence. Specifically, FIG. 7 is a flow diagram illustrating the process flow of the main thread in accordance with an embodiment of the present invention. At 700, the main thread loads a user configuration including parameters of the topmost window, such as line style (or picture type, if a non-line picture is preferred), the line color and transparency, the width and length of the line, the movement of the line, and the density of the line. It should be noted that this user configuration can be specific to a particular user of the computing device, in that a different user of the same computing device may have a different configuration, or the configuration may be applicable to all users of the computing device. The user can therefore modify the operation of the virtual picket fence by altering parameters in this user configuration. At 702, a topmost window is opened. At 704, a controller thread is started using the user configuration.

The topmost window is always shown at the top (i.e., above any content windows). It acts to simulate an external apparatus to protect casual onlookers from viewing the screen. The topmost window can transmit (i.e., pass through) any mouse or keyboard events to content windows below, so that the user can use any software under the topmost window. The user may also be provided with the ability to resize and move the topmost window to fit the area which the user wants to protect.

The controller thread controls the working mechanism of the topmost window, and can be used to control the topmost window to include the proper moving lines and/or picture and adjust the topmost windows' parameters.

Figure 8:
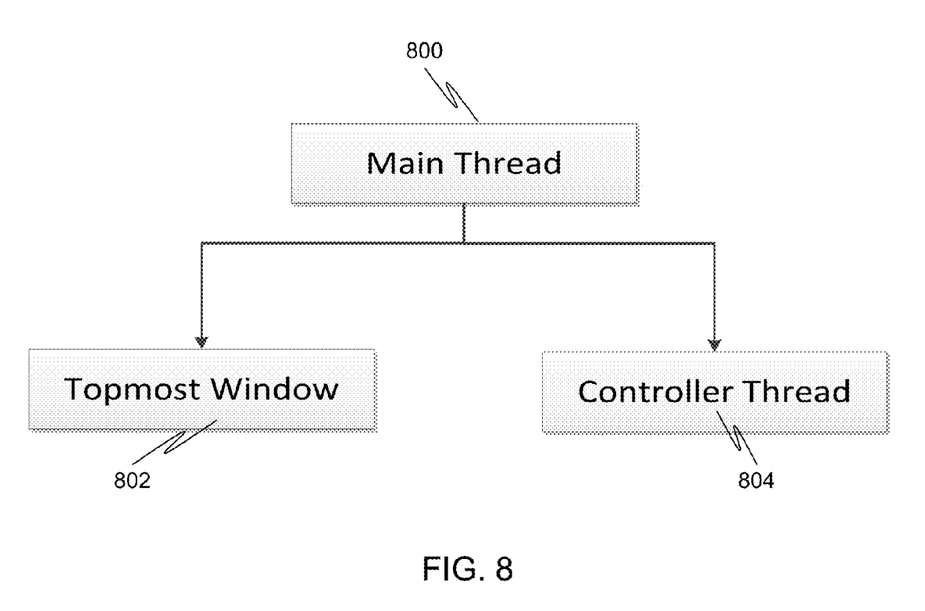
FIG. 8 is a block diagram illustrating the components of the software of an embodiment of the present invention.

FIG. 8 is a block diagram illustrating the components of the software of an embodiment of the present invention. Here, main thread 800 opens topmost window 802 and controller thread 804.

Figure 9:
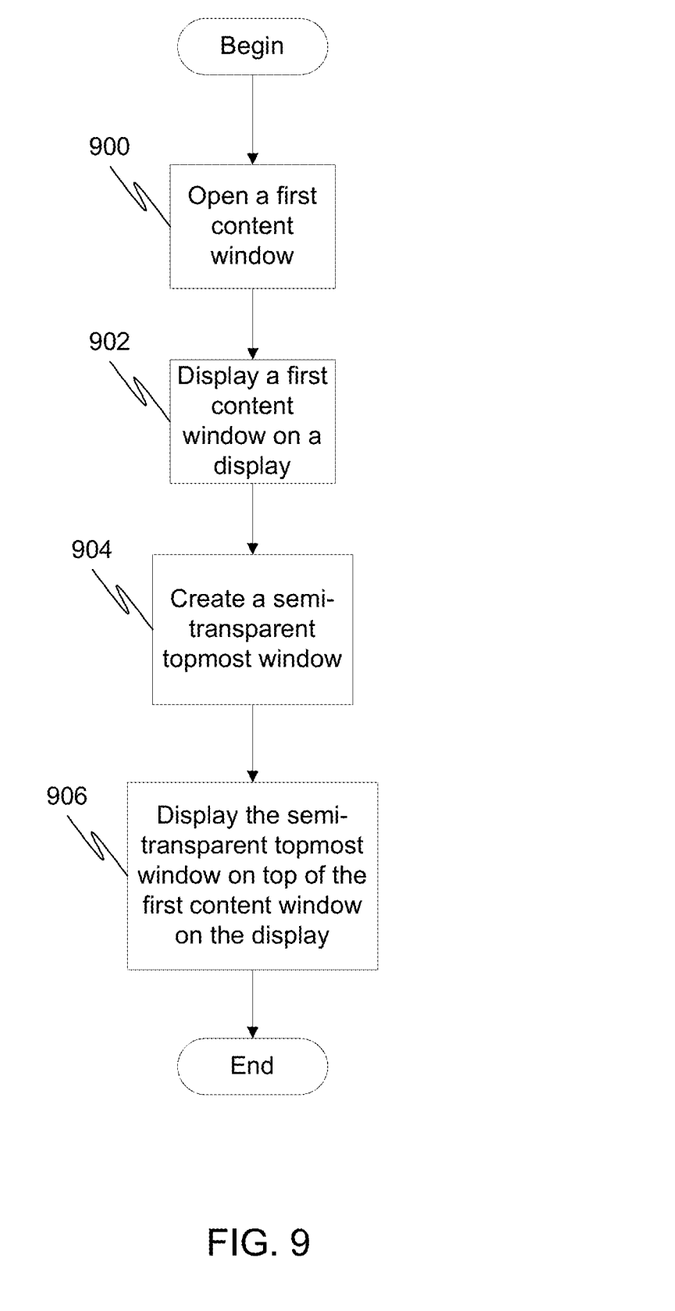
FIG. 9 is a flow diagram illustrating a method for providing a privacy filter on a computing device in accordance with an embodiment of the present invention.

FIG. 9 is a flow diagram illustrating a method for providing a privacy filter on a computing device in accordance with an embodiment of the present invention. At 900, a first content window is opened. This content window may be opened by an operating system, application, or other process of the computing device. At 902, the first content window is displayed on a display of the computing device. At 904, a semi-transparent topmost window is created, wherein the semi-transparent topmost window includes a moving privacy pattern designed to obscure first portions of the content window at a first time and obscure second portions of the content window at a second time. In one embodiment of the present invention, the first and second portions represent interlaced portions of the display, such that both portions together reveal the entire image, but either alone represents only half of the image, divided evenly throughout the screen. In one example, the first portion may represent only the odd numbered columns of a window while the second portion may represent only the even numbered columns of a window. At 906, the semi-transparent topmost window is displayed on top of the first content window on the display of the computing device.

Desktop Device Embodiment

Figure 10:
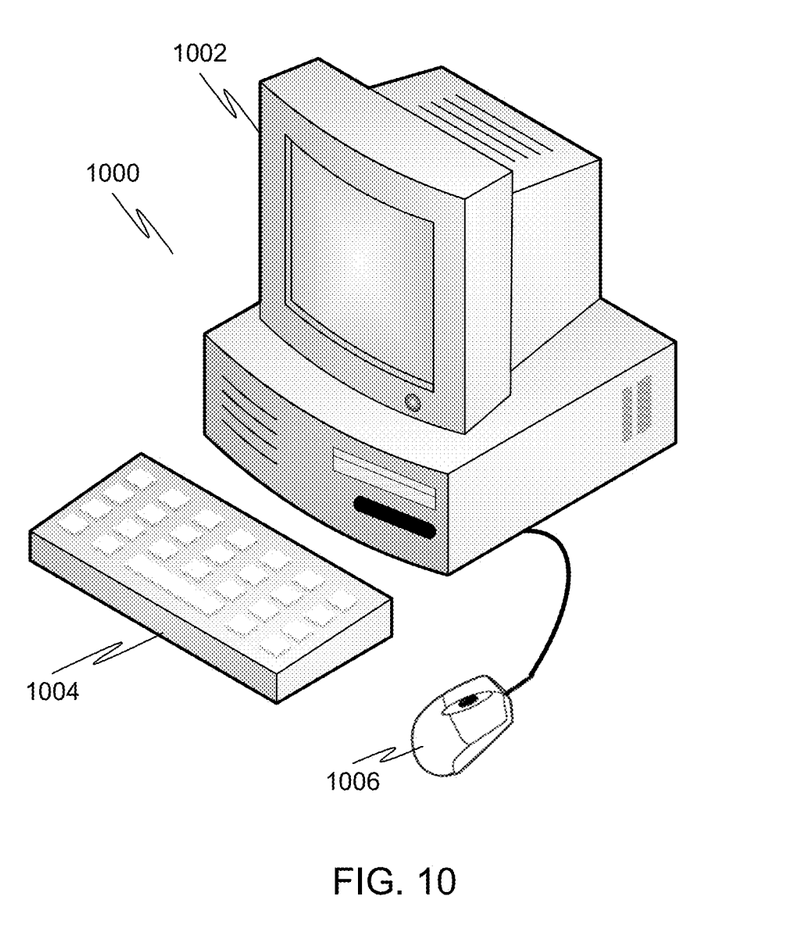
FIG. 10 illustrates a desktop device suitable for implementing embodiments of the present invention.

FIG. 10 illustrates a desktop device 1000 suitable for implementing embodiments of the present invention. FIG. 10 shows one possible physical form of the desktop device. Of course, the computer system may have many physical forms including an integrated device, such as a desktop computer, television, or digital picture frame. Desktop device may include a display 1002. In this instance, the display 1002 is not a touchscreen display, but in some embodiments the display could be touchscreen. Touchscreen displays will be described in more detail below with respect to the mobile device embodiment. The desktop device 1000 also includes an attached keyboard 1004 and mouse 1006, which act as user input devices. As described earlier, the semi-transparent topmost window may be configured to receive user input events pertaining to the underlying content window and pass these user input events to the underlying content window. In the case of a keyboard 1004 and mouse 1006 embodiment, this would involve tracking the location of a cursor 1008 on the display and noting the location of the cursor 1008 when the keyboard 1006 or mouse 1008 is used, as well as the actual input received fro the keyboard 1006 or mouse. This information may then be passed to the underlying content window.

Desktop device 1000 may also include various types of memory (not pictured), including random access memory (RAM) and read-only memory (ROM). As is well known in the art, ROM acts to transfer data and instructions uni-directionally to a processor and RAM is used typically to transfer data and instructions in a bi-directional manner. Both of these types of memories may include any suitable of the computer-readable media described below. A fixed disk may also be coupled bi-directionally to the processor; it provides additional data storage capacity and may also include any of the computer-readable media described below. The fixed disk may be used to store programs, data and the like and is typically a secondary storage medium (such as a hard disk) that is slower than primary storage. It will be appreciated that the information retained within fixed disk, may, in appropriate cases, be incorporated in standard fashion as virtual memory in memory.

Mobile Device Embodiment

Figure 11:
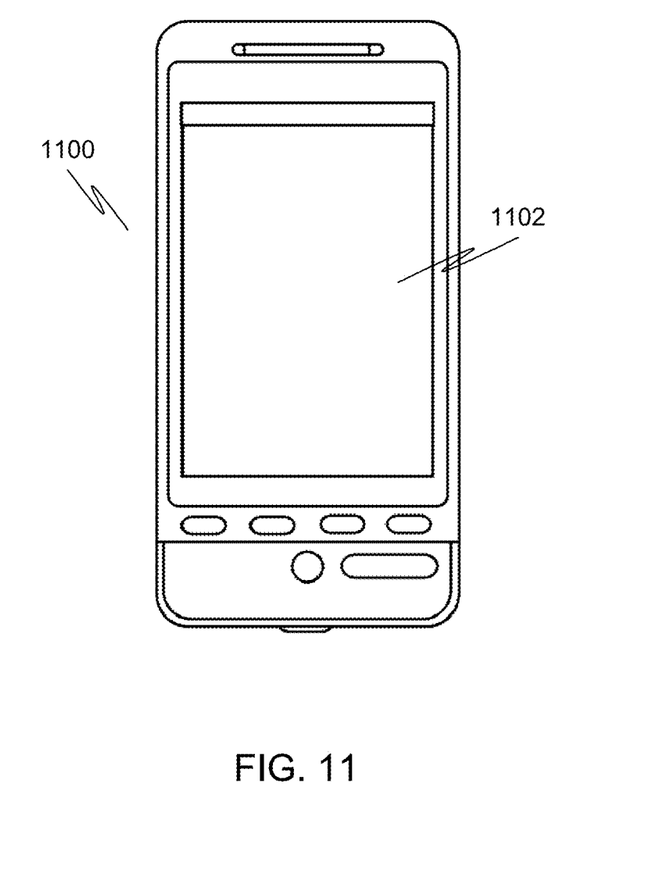
FIG. 11 illustrates a mobile device suitable for implementing embodiments of the present invention.

FIG. 11 illustrates a mobile device 1100 suitable for implementing embodiments of the present invention. FIG. 11 shows one possible physical form of the mobile device. Of course, the computer system may have many physical forms including an integrated circuit, a printed circuit board, a small handheld device (such as a mobile telephone or PDA), large handheld device (such as a tablet computer), or laptop computer. In the depicted embodiment, a mobile phone 1100 is depicted.

Mobile phone 1100 may include a display 1102, which may also act as a user input mechanism. In this instance, the display 1102 is a touchscreen display. In other non-depicted embodiments the user input mechanism may be physical buttons or other controllers located on the mobile device 1100, either in addition to or in lieu of the touchscreen display.

As described earlier, the semi-transparent top-most window may be configured to receive user input events pertaining to the underlying content window and pass these user input events to the underlying content window. In the case of a touchscreen 1102 embodiment, this would involve tracking the location where a user presses on the touchscreen. This information may then be passed to the underlying content window.

Mobile phone 1100 may also include various types of memory (not pictured), including random access memory (RAM) and read-only memory (ROM). As is well known in the art, ROM acts to transfer data and instructions uni-directionally to a processor and RAM is used typically to transfer data and instructions in a bi-directional manner. Both of these types of memories may include any suitable of the computer-readable media described below. A fixed disk may also be coupled bi-directionally to the processor; it provides additional data storage capacity and may also include any of the computer-readable media described below. The fixed disk may be used to store programs, data and the like and is typically a secondary storage medium (such as a hard disk) that is slower than primary storage. It will be appreciated that the information retained within fixed disk, may, in appropriate cases, be incorporated in standard fashion as virtual memory in memory.

Mobile device 1100 may also include various types of communications interfaces. This may include a cellular voice interface, as well as a mobile Internet interface.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method for providing a privacy filter on a computing device, the method comprising:
opening a first content window;
displaying the first content window on a display of the computing device;

creating a semi-transparent topmost window, wherein the semi-transparent topmost window includes a moving privacy pattern designed to obscure first portions of the content window at a first time and obscure second portions of the content window at a second time; and displaying the semi-transparent topmost window on top of the first content window on the display of the computing device, wherein said privacy pattern is moving at a rate sufficient to render said moving privacy pattern imperceptible to a user viewing said topmost window at a substantially perpendicular angle to said display.

2. The method of claim 1, wherein the rate is software-adjustable to dynamically change an angle at which a viewer cannot read the first content window.

3. The method of claim 2, wherein the parameters include one or more of the following: line style, line width, line length, line color, line transparency, and line density.

4. The method of claim 2, wherein the parameters are software-adjustable to dynamically change the distance d.

5. The method of claim 1, wherein the privacy pattern includes parameters that make the first content window unreadable at any distance greater than a distance d from the display.

6. The method of claim 1, wherein the moving privacy pattern is a series of uniform shapes.

7. The method of claim 1, wherein the semi-transparent topmost window includes transparent portions and non-transparent portions.

8. The method of claim 1, further comprising:
opening a second content window; and
displaying the second content window on the display of the computing device without displaying the semi-transparent topmost window on top of the second content window.

9. The method of claim 1, wherein all portions of said first content window can be viewed clearly by said user.

10. The method of claim 9, wherein said moving privacy pattern blocks said first content window from viewing by a second user who is at a substantially non-perpendicular angle from said display.

11. A method for limiting viewability of a content window on a display of a computing device, the method comprising:
operating a main thread of an operating system of the computing device to load a user configuration, wherein the user configuration specifies parameters of a moving privacy pattern;
causing the main thread to open a topmost window, wherein the topmost window covers at least one content window on the display; and
causing the main thread to open a controller thread using the user configuration, wherein the controller thread operates to generate said moving privacy pattern in the topmost window in accordance with the parameters of the user configuration, wherein said privacy pattern is moving at a rate sufficient to render said moving privacy pattern imperceptible to a user viewing said topmost window at a substantially perpendicular angle to said display.

12. The method of claim 11, wherein the parameters of the user configuration that are used to generate the moving privacy pattern are modified subsequent to the causing of the main thread to open a controller thread, causing a previously displayed moving privacy pattern in the topmost window to be dynamically altered.

13. The method of claim 11, wherein the user configuration is tied to a particular user of the computing device, and a different user of the same computing device has a different user configuration.

14. The method of claim 11, wherein the topmost window is movable by a user.

15. The method of claim 11, wherein the topmost window is resizable by a user.

16. The method of claim 11, wherein the topmost window is configured to capture user input events within the topmost window and pass the user input events to the at east one content window covered by the topmost window.

17. The method of claim 11, wherein said content window can be viewed clearly by said user.

18. The method of claim 17, wherein said moving privacy pattern blocks said content window from viewing by a second user who is at a substantially non-perpendicular angle from said display.

19. A method for creating a virtual privacy screen on a computing device, the method comprising:
creating a semi-transparent topmost window covering at least a portion of displayable content on a display of the computing device;
filling the semi-transparent topmost window with a moving animation including parallel lines divided by transparent lines, wherein the parallel lines are semi-transparent or non-transparent, wherein the animation moves the parallel lines in a direction that is perpendicular to the lines at a rate specified by an adjustable parameter; and
causing the semi-transparent topmost window to be displayed over at least the portion of displayable content on the display of the computing device, wherein said moving animation is imperceptible to a viewer who views the display from a perpendicular angle and within a defined distance, but acts to block a viewer from seeing the covered portion of the displayable content when a viewer views said display from a substantially non-perpendicular angle or from beyond the defined distance.

20. The method of claim 19, wherein the animation is visually appealing to distract the eyes of a viewer viewing the display from a substantially non-perpendicular angle or from beyond the defined distance.

21. The method of claim 20, wherein the animation is visually appealing by virtue of the color of the parallel lines.

22. The method of claim 19, wherein the adjustable parameter is adjusted by software.

23. The method of claim 19, wherein said displayable content can be viewed clearly by said viewer who views said display from a perpendicular angle and within a defined distance.

* * * * *